United States Patent [19]

Eriksson

[11] Patent Number: 4,610,075
[45] Date of Patent: Sep. 9, 1986

[54] TOOL HOLDER FOR INDUSTRIAL ROBOTS

[75] Inventor: Erik Eriksson, Västerås, Sweden

[73] Assignee: ASEA Aktiebolag, Västerås, Sweden

[21] Appl. No.: 677,527

[22] Filed: Nov. 30, 1984

[30] Foreign Application Priority Data

Dec. 1, 1983 [SE] Sweden ................. 8306630

[51] Int. Cl.<sup>4</sup> ........................................ B23Q 3/157
[52] U.S. Cl. ........................................ 29/568; 279/4; 409/232; 409/233
[58] Field of Search ............... 409/209, 231, 233; 29/264, 568; 279/4, 1 DA, 1 DC; 408/238, 239 R

[56] References Cited

U.S. PATENT DOCUMENTS 4,084,462 4/1978 Grinage .................. 409/233

FOREIGN PATENT DOCUMENTS 1087875 8/1960 Fed. Rep. of Germany ...... 408/238

Primary Examiner—Gil Weidenfeld
Assistant Examiner—Glenn L. Webb
Attorney, Agent, or Firm—Watson, Cole, Grindle & Watson

[57] ABSTRACT

A tool holder for an industrial robot intended to permit a programmed automatic replacement of tools. The holder and the tool are formed with connecting elements adapted to each other. The holder includes a cylinder housing, in which two pistons, interconnected by a connecting member, are slidably located. This connecting member is formed with a radially oriented, axially elongated opening with two different widths. On either side of the narrower opening part the connecting member is formed with camming surfaces which are inclined relative to an axial plane through the pistons.

6 Claims, 4 Drawing Figures

TOOL HOLDER FOR INDUSTRIAL ROBOTS

BACKGROUND OF THE INVENTION

This invention relates to a tool holder for a robot which permits a programed replacement of tools after a certain operating time, or between consecutive machining operations which require different tools to be used. The tools are placed in tool magazines to which the robot delivers a tool and from which it collects a new one. The tools are formed with or connected to attachments by means of connecting members which are adapted to a gripper in the tool holder of the robot.

The problems when using known tool attachments for replaceable tools are, on the one hand, the weight of the known attachments, which utilizes too great a part of the overall lifting capacity of a robot, and, on the other hand, the size of the known attachments, which restricts the range of locations in which machining operations can be performed.

OBJECT OF THE INVENTION

One object of this invention is to provide a compact tool holder for a robot which is capable of retaining a tool with a strong holding force and which makes it possible to locate the tool close to the bending axis of a wrist of the robot.

SUMMARY OF THE INVENTION

According to the invention, the tool holder is constructed with a cylinder housing which is suitably connected, via its side, to the tool carrier of the wrist of the robot. The cylinder housing suitably has a through-going cylinder bore which is sealed at opposite ends of the cylinder housing. Two axially-aligned pistons are slidably located in the cylinder bore and are fixedly interconnected by means of a connecting member. The pistons and the connecting member may consist of one single unit. The connecting member is provided with a radial, axially-elongated opening having two different widths. The part of the member with the smaller width opening is provided, on at least one side of the opening, with a camming surface which inclines in relation to an axial plane through the pistons. This camming surface is intended to cooperate with a tool attachment and, upon displacement of the pistons, exerts a holding force against a coacting member on the tool attachment.

BRIEF DESCRIPTION OF THE DRAWING

One embodiment of tool holder will now be described in greater detail, by way of example, with reference to the accompanying drawing, in which.

DESCRIPTION OF THE PREFERRED EMBODIMENT

Figure 1:
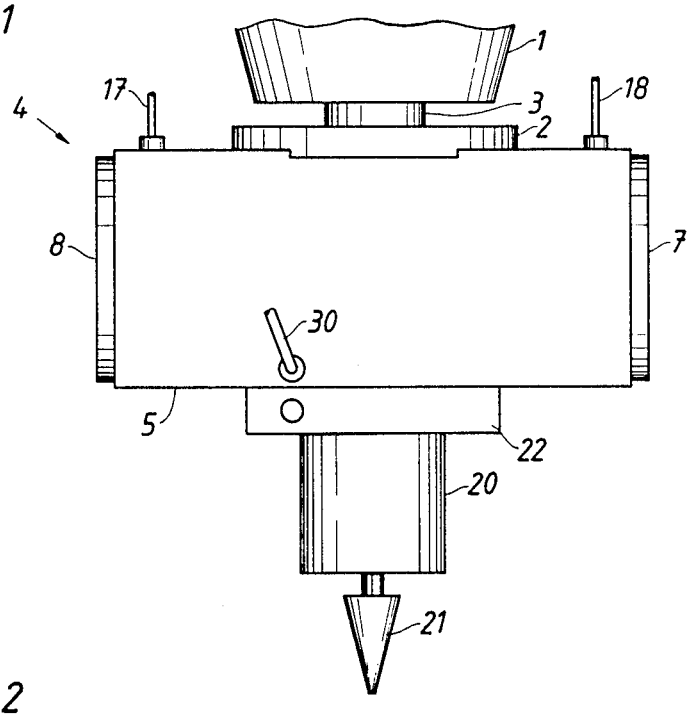
FIG. 1 is a side elevation of the outermost part of a robot wrist with a tool holder and a tool supported by the holder.
Figure 2:
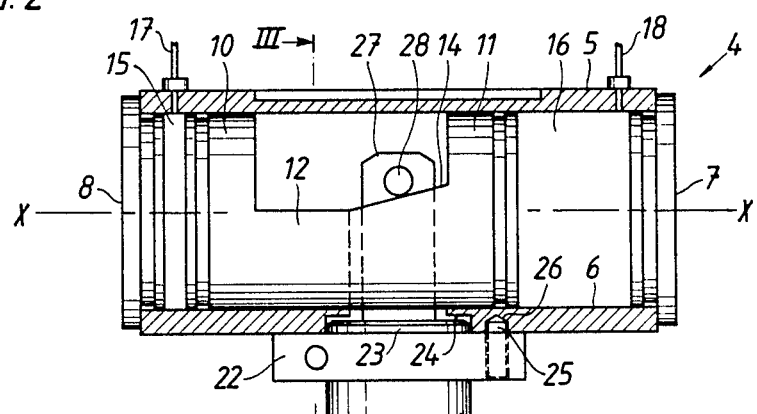
FIG. 2 is an axial section of the tool holder through a mid-plane of the tool.
Figure 3:
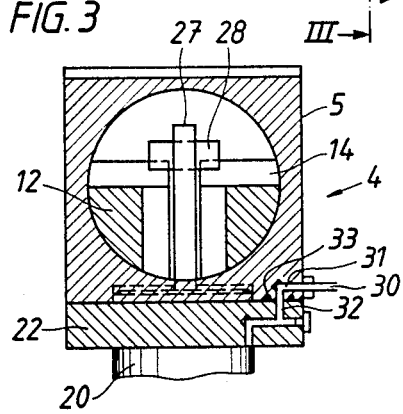
FIG. 3 is a radial section taken on the line III in FIG. 2.
Figure 4:
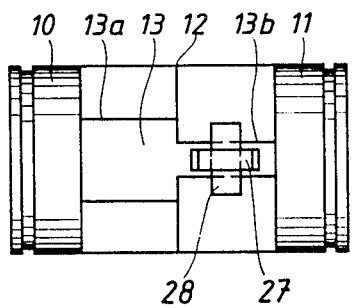
FIG. 4 shows a twin piston included in the holder, as well as parts on a tool attachment cooperating with the piston.

In the drawing, 1 designates the outer part of the wrist of a robot and 2 designates a tool carrier which is rotatably journalled to the wrist by a shaft 3. A tool holder 4 is attached to the tool carrier 3 by bolts (not shown). The tool holder 4 includes a cylindrical housing 5 with a cylinder bore 6, which is closed at its ends by means of covers 7 and 8. Pistons 10 and 11 are slidably disposed within the cylinder bore 6 and are interconnected by means of a connecting part 12. The pistons and the connecting part are shown formed in one piece, the connecting part having been formed by removing material between the pistons. Such a unitary construction is not essential, however. The connecting part 12 has a radially oriented, axially elongated slot 13 having two different widths, a part 13a having a greater width than a part 13b. Camming surfaces 14 at the sides of the part 13b incline towards the imaginary horizontal axial plane X—X through the pistons 10, 11. Spaces 15 and 16, respectively, between the cover 8 and the piston 10 and between the cover 7 and the piston 11 communicate, through conduits 17 and 18 and operating valves (not shown), with a propellant source (not shown), usually a compressed-air source. By supplying propellant to either space 15 or to space 16, the pistons 10 and 11 are displaced in the desired direction. Conduits 17 and 18 thus constitute actuation means for the pistons 10 and 11 and the connecting part 12.

The tool holder 4 is intended for use with readily replaceable tools. The drawing schematically shows a compressed air-driven tool 20 with a rotary file 21 for, for example, a deburring operation. The tool 20 is supported by a tool attachment 22 adapted to the tool holder 4. The tool attachment is provided with a circular locating projection 23 intended to cooperate with a circular locating recess 24 in the cylinder housing 5 and with a guide pin 25 which cooperates with a guide hole 26. The components 23-26 ensure the tool 20 is fixed in the correct position relative to the tool holder 4. Further, the attachment 22 is provided with an elongated supporting arm 27 (shown of rectangular cross-section but this is not essential), which is provided on its outer part with a transverse mounting pin 28 having a greater length than the width of the slot part 13b. Instead of a mounting pin 28, the arm 27 can have an enlarged mounting part at its end which has a greater width than the width of the slot part 13b. The pin (or enlarged end) 28 cooperates with the inclined camming surfaces 14 on either side of the slot part 13b when the space 16 is pressurized and the piston 11 is displaced to the left. The inclination of the camming surfaces 14 ensures a wedging effect so that the attachment 22 is held with a great force against the cylinder housing 5.

When it is decided to use tools on the basis of a programed replacement after a certain period of tool use selected with respect to anticipated wear, or when robot use requires the replacement of tools between two work operations which require different tools, the robot inserts the currently employed tool in a tool magazine (not shown), the cylinder space 16 is opened and the cylinder space 15 is pressurized, the piston 10 thus being displaced to the right so that the tool attachment 22 is released. The arm 27 with the pin 28 can now pass through the wider part 13a of the opening 13 dropping the old tool in the magazine. The robot arm is now moved over the arm 27 of a new tool in the tool magazine. When the robot has placed the tool holder in the correct position relative to the tool attachment on the new tool, i.e., with the arm 27 projecting through the wider part 13a of the opening 13, the cylinder space 15 is opened and the cylinder space 16 is re-pressurized.

The new tool is thus fixed and locked in the tool holder when the inclined surfaces 14 bear on the pin 28.

In the tool holder 4, means for automatic connection of the tool attachment 22 and the tool 20 to a compressed air source are provided. A conduit 30 is connected to the cylinder housing 5, and leads to a channel 31 therein which opens to the contact surface between the housing 5 and the tool attachment 22 directly in line with a channel 32 which communicates with the tool 20. The housing 5 includes a sealing ring 33 in the contact surface around the orifice of the channel 31, although it will be appreciated the sealing ring could just as well be located in the tool attachment 22. Depending on the type of tool, several connections for transmitting separate supplies of pressurized fluid to the tool may be required, and to allow for this possibility, the tool holder is conveniently provided with between two and four connections, one or more being utilized as required for each tool used.

By locating a pressure spring in the cylinder space 16 so that it always urges the piston 11 to the left, as shown in the drawing, the locking effect on a tool can be retained in the case of a loss of pressure. The addition of such a spring thus increases the reliability of the tool holder in use.

Many modifications are possible to the specific design featured in the drawing and the invention covers all such modifications within the scope of the following claims.

What is claimed is:

1. A tool holder for operatively connecting working tool attachments to a tool carrier of an industrial robot, each working tool attachment including an elongated supporting arm having a free end and a transverse mounting portion near the free end, the transverse mounting portion extending away from said elongated supporting arm to define a greater width than the width of the elongated supporting arm, the tool holder comprising a cylindrical housing which is enclosed at its opposite first and second ends, first and second pistons positioned in said cylindrical housing to be movable between said first and second ends, said first piston facing said first end of said cylindrical housing and said second piston facing said second cylindrical housing, said first and second pistons, when positioned vertically above a said working tool attachment, defining an imaginary horizontal axial plane therethrough, an elongated connecting member extending between said first and second pistons, said elongated connecting member including first and second axial portions, said first axial portion including a vertical, axially extending opening therethrough having a first width which is greater than the width of either the transverse mounting portion or the elongated supporting arm portion of a said working tool attachment, such that the transverse mounting portion of a said working tool attachment can be vertically moved therethrough, said second axial portion defining an upper surface which slants downwardly in the direction of said first axial portion and including a vertical, axially extending opening therethrough having a second width which is greater than the width of the elongated supporting arm of a said working tool attachment but less than the width of the transverse mounting portion thereof, such that the transverse mounting portion of a said working tool attachment can be supported by the upper surface of said second axial portion, and actuation means connected to said cylindrical housing to supply a pressure medium thereto to move said first and second pistons and said connecting member between said first and second ends of said cylindrical housing.

2. A tool holder according to claim 1, wherein said actuation means comprises first and second conduit means connected to said cylindrical housing near its respective first and second ends to enable a propellant fluid to be either supplied to or removed from said cylindrical housing in the areas between said first end thereof and said first piston and said second end thereof and said second piston.

3. A tool holder according to claim 1, wherein said cylindrical housing includes a recess extending into its lowermost periphery to seat a projection of a said working tool attachment.

4. A tool holder according to claim 1, wherein the upper surface of the second axial portion of said elongated connecting means is flat and slopes downwardly toward said imaginary horizontal axial plane.

5. A tool holder according to claim 4, wherein the first axial portion of said elongated connecting portion defines a flat upper surface which is parallel to said imaginary horizontal axial plane.

6. A tool holder according to claim 1, wherein said first and second pistons and said connecting member are portions of a single, unitary element.

* * * * *